US006990469B2

(12) United States Patent
Ryan, Jr.

(10) Patent No.: US 6,990,469 B2
(45) **Date of Patent: *Jan. 24, 2006**

(54) METHOD FOR REISSUING INDICIUM IN A POSTAGE METERING SYSTEM

(75) Inventor: Frederick W. Ryan, Jr., Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 619 days.

This patent is subject to a terminal disclaimer.

(21) Appl. No.: 09/742,833

(22) Filed: Dec. 20, 2000

(65) Prior Publication Data

US 2002/0077990 A1 Jun. 20, 2002

(51) Int. Cl.
*G06F 17/60* (2006.01)

(52) U.S. Cl. ........................ 705/60; 705/61; 705/62; 705/401; 705/403; 705/408

(58) Field of Classification Search .................... 705/1, 705/60, 62, 410, 401, 408, 405; 235/375; 380/51; 382/100, 101
See application file for complete search history.

(56) References Cited

U.S. PATENT DOCUMENTS

| | | | | |
|---|---|---|---|---|
| 5,625,694 A | | 4/1997 | Leet et al. | 380/23 |
| 5,675,650 A | * | 10/1997 | Cordery et al. | 380/23 |
| 5,768,132 A | | 6/1998 | Cordery et al. | 364/464.2 |
| 5,781,438 A | | 7/1998 | Lee et al. | 364/464.14 |
| 5,787,405 A | * | 7/1998 | Gregory | 705/45 |
| 5,835,689 A | | 11/1998 | Braun et al. | 395/113 |
| 5,987,441 A | | 11/1999 | Lee et al. | 705/401 |
| 6,260,028 B1 | | 7/2001 | Lee et al. | 705/401 |
| 6,285,990 B1 | * | 9/2001 | Lee et al. | 705/60 |
| 2001/0037735 A1 | | 11/2001 | Lee et al. | 101/91 |

FOREIGN PATENT DOCUMENTS

| | | |
|---|---|---|
| JP | 09311962 A | 12/1997 |

* cited by examiner

*Primary Examiner*—James P. Trammell
*Assistant Examiner*—James A. Reagan
(74) *Attorney, Agent, or Firm*—Steven J. Shapiro; Angelo N. Chaclas

(57) ABSTRACT

A method of reissuing secured postage indicium includes the steps of dispensing from a postage meter an original postage indicium as evidence of postage dispensed for a requested postage transaction, the original postage indicium including postage information and authentication information; storing within the postage meter a transaction record for the dispensed original postage indicium, the transaction record including the postage information and the authentication information; and receiving at the postage meter a request to reissue the original postage indicium. The inventive method further includes subsequent to receiving the reissue request the steps of obtaining the postage information and the authentication information from the transaction record; combining the obtained postage information and the authentication information with an indicator thereby creating a modified original postage indicium; and dispensing the modified original postage indicium from the postage meter so that the indicator is obtainable from the dispensed modified original postage indicium to identify that the dispensed modified original postage indicium is a reissue of the original postage indicium.

20 Claims, 8 Drawing Sheets

120

122

| DATA ELEMENTS | BARCODE DATA | HUMAN-READABLE DATA | LENGTH (BYTES) | FIELD NUMBER |
|---|---|---|---|---|
| INDICIA VERSION NUMBER | YES | NO | 1 | 1 |
| ALGORITHM ID | YES | NO | 1 | 2 |
| CERTIFICATE SERIAL NUMBER | YES | NO | 4 | 3 |
| DEVICE ID | | | | |
| - PSD MANUFACTURER ID | YES | YES | 2 | 4 |
| - PSD MODEL ID | YES | YES | 2 | 5 |
| - PSD SERIAL NUMBER | YES | YES | 4 | 6 |
| ASCENDING REGISTER | YES | NO | 5 | 7 |
| POSTAGE | YES | YES | 3 | 8 |
| DATE OF MAILING | YES | YES | 4 | 9 |
| ORIGINATING ADDRESS: | | | | |
| - CITY, STATE, ZIP CODE | NO | YES | — | — |
| - LICENSING ZIP CODE | YES | NO | 4 | 10 |
| DESTINATION DELIVERY POINT | YES | NO | 5 | 11 |
| SOFTWARE ID | YES | NO | 6 | 12 |
| DESCENDING REGISTER | YES | NO | 4 | 13 |
| MAIL CLASS OR CATEGORY | | | | |
| - RATE CATEGORY | YES | NO | 4 | 14 |
| - ENDORSEMENT (MAIL CLASS) | NO | YES | — | — |
| 123 → DIGITAL SIGNATURE | YES | NO | DSA 40 / RSA 128 / ECDSA 40 | 15 |
| 124 → RESERVE FIELD | YES | NO | VARIABLE SIZE | 16 |

FIG. 6

222

| DATA ELEMENTS | BARCODE DATA | HUMAN-READABLE DATA | LENGTH (BYTES) | FIELD NUMBER |
|---|---|---|---|---|
| INDICIA VERSION NUMBER | YES | NO | 1 | 1 |
| ALGORITHM ID | YES | NO | 1 | 2 |
| CERTIFICATE SERIAL NUMBER | YES | NO | 4 | 3 |
| DEVICE ID | | | | |
| - PSD MANUFACTURER ID | YES | YES | 2 | 4 |
| - PSD MODEL ID | YES | YES | 2 | 5 |
| - PSD SERIAL NUMBER | YES | YES | 4 | 6 |
| ASCENDING REGISTER | YES | NO | 5 | 7 |
| POSTAGE | YES | YES | 3 | 8 |
| DATE OF MAILING | YES | YES | 4 | 9 |
| ORIGINATING ADDRESS: | | | | |
| - CITY, STATE, ZIP CODE | NO | YES | — | — |
| - LICENSING ZIP CODE | YES | NO | 4 | 10 |
| DESTINATION DELIVERY POINT | YES | NO | 5 | 11 |
| SOFTWARE ID | YES | NO | 6 | 12 |
| DESCENDING REGISTER | YES | NO | 4 | 13 |
| MAIL CLASS OR CATEGORY | | | | |
| - RATE CATEGORY | YES | NO | 4 | 14 |
| - ENDORSEMENT (MAIL CLASS) | NO | YES | — | — |
| 123 → DIGITAL SIGNATURE | YES | NO | DSA 40 / RSA 128 / ECDSA 40 | 15 |
| 224 → | YES | NO | VARIABLE SIZE | 16 |

FIG. 8

METHOD FOR REISSUING INDICIUM IN A POSTAGE METERING SYSTEM

FIELD OF THE INVENTION

The present invention relates to metering systems and, in particular, to metering systems that permit the reissuance of secure indicium as evidence of value dispensed by the metering system.

BACKGROUND OF THE INVENTION

Postage meters have significantly evolved over the past twenty years with the migration from mechanical meters to electronic meters to personal computer and internet based postage metering products. As part of this evolution, certain postage meter products now make use of general-purpose printers for printing an indication of postage value (postage indicium) dispensed by the postage metering system. These general purpose printers do not handle envelopes very well and a number of printer failure modes may occur that result in either no indicium, an incomplete indicium, or an unreadable indicium being produced by the printer (for purposes of this application all three invalid indicium conditions are collectively referred to as misprints). When a misprint occurs, the postage metering system has already accounted for the postage value within its accounting registers, but the customer does not have a viable mailpiece with a postage indicium that is acceptable by the postal authority. Accordingly, a new mailpiece with a valid postage indicium must be produced and the customer charged a second time. The customer's only recourse to recover the lost funds associated with the misprint is to bring the mailpiece with the misprint to the postal authority for a refund. Naturally, where the printer failed to print anything, the customer would have no ability to collect a refund at all.

Pending U.S. patent application Ser. No. 08/575,110, filed Dec. 19, 1995 and which is hereby incorporated by reference, attempts to overcome the above problem by permitting the customer to reprint individual cryptographically secure indicium in the eve nt of a misprint condition. Furthermore, the aforementioned application allows this reissue to occur without accounting for the reissued indicium within the meter accounting system module. Unfortunately, postal authorities have been reluctant to authorize the reissue feature described in the aforementioned application because it does not provide a way to distinguish an original indicium from a reissued indicium. The postal authorities are fearful that an unscrupulous customer might attempt to print multiple reissued indicium as a way of defrauding the postal authority out of the postage revenue that it is entitled to. That is, the original indicium and the reissued indicium would both enter the mailstream while only the original indicium was properly account ed for within the postage metering system.

SUMMARY OF THE INVENTION

The instant invention is directed toward overcoming the problems discussed above with respect to distinguishing between reissued and original indicium. Moreover, additional embodiments of the invention provide methods for detecting customers who are performing an excessive amount of indicium reissues.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which:

FIG. 6 is a table showing the data elements within the original postage indicium of FIG. 5;

FIG. 8 is a table showing the data elements within the modified original postage indicium of FIG. 7;

DETAILED DESCRIPTION OF THE PRESENT INVENTION

Figure 1:
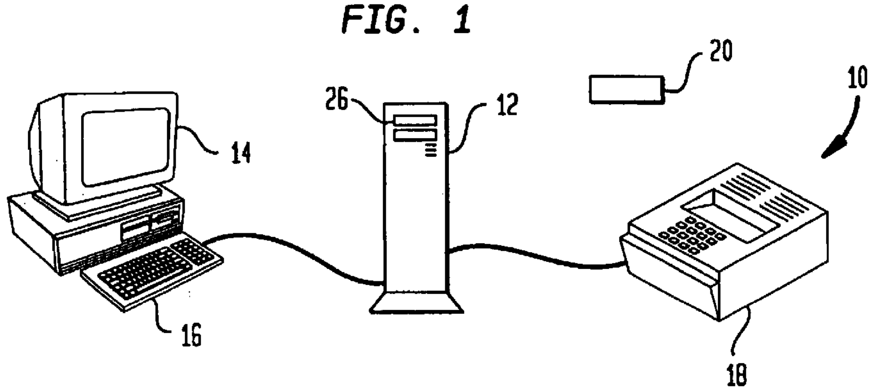
FIG. 1 is a block diagram of a PC-based metering system in which the present invention operates.

In describing the present invention, reference is made to the drawings, wherein there is seen in FIGS. 1–4 an open system PC-based postage meter, also referred to herein as a PC metering system, generally referred to as 10, in which the inventive postage indicium reissue process is accomplished. PC meter system 10 includes a conventional personal computer 12 configured to operate as a host to a removable metering device or electronic vault, generally referred to as 20, in which postage funds are stored. Electronic vault 20 may be directly connected to PC 12 or connected via any suitable communication network (e.g. internet, cellular, LAN, WAN). PC meter system 10 uses the personal computer 12 and its printer 18 to print cryptographically secure evidence of postage paid (postage indicium) on envelopes at the same time it prints a recipient's address or to print labels for pre-addressed return envelopes or large mailpieces. It will be understood that although the preferred embodiment of the present invention is described with regard to a postage metering system, the present invention is applicable to any value metering system that performs transaction evidencing.

As used herein, the term personal computer is used generically and refers to present and future microprocessing systems with at least one processor operatively coupled to user interface means, such as a display and keyboard, and storage media. The personal computer may be a workstation that is accessible by more than one user.

The PC-based postage meter 10 includes the personal computer (PC) 12, a display 14, a keyboard 16, and the non-secured digital printer 18, preferably a laser or ink-jet printer. PC 12 includes a conventional processor 22, such as the 80486 and Pentium processors manufactured by Intel, and conventional hard drive 24, floppy drive(s) 26, and memory 28. Electronic vault 20, which is housed in a removable card, such as PCMCIA card is a secure encryption device for postage funds management, digital signature generation and traditional accounting functions. PC meter system 10 may also include an optional modem 29 which is located preferably in PC 12. Modem 29 may be used for communicating with a Postal Service or a postal authenticating vendor for recharging funds (debit or credit). In an alternate embodiment the modem 29 may be located in vault 20.

PC meter system 10 further includes a Windows-based PC software module 34 that is accessible from conventional Windows-based word processing, database, accounting and spreadsheet application programs 36. PC software module 34 includes a vault dynamic link library (DLL) 40, a user interface module 42, and a plurality of sub-modules that control the metering functions. DLL module 40 securely communicates with vault 20 and provides an open interface to Microsoft Windows-based application programs 36 through user interface module 42. DLL module 40 also securely stores the fixed data of the postage indicium image and a copy of the transaction records associated with the distribution of postal funds into and out of the vault 20. User interface module 42 provides application programs 36 access to an electronic postage indicium image from DLL module 40 for printing of the postage indicium on a document, such as an envelope or label. User interface module 42 also provides application programs the capability to initiate remote refills and to perform administrative functions.

Thus, PC-based meter system 10 operates as a conventional personal computer with attached printer that becomes a postage meter upon user request. Printer 18 prints all documents normally printed by a personal computer, including printing letters and addressing envelopes, and in accordance with the present invention, prints postage indicia.

Figure 2:
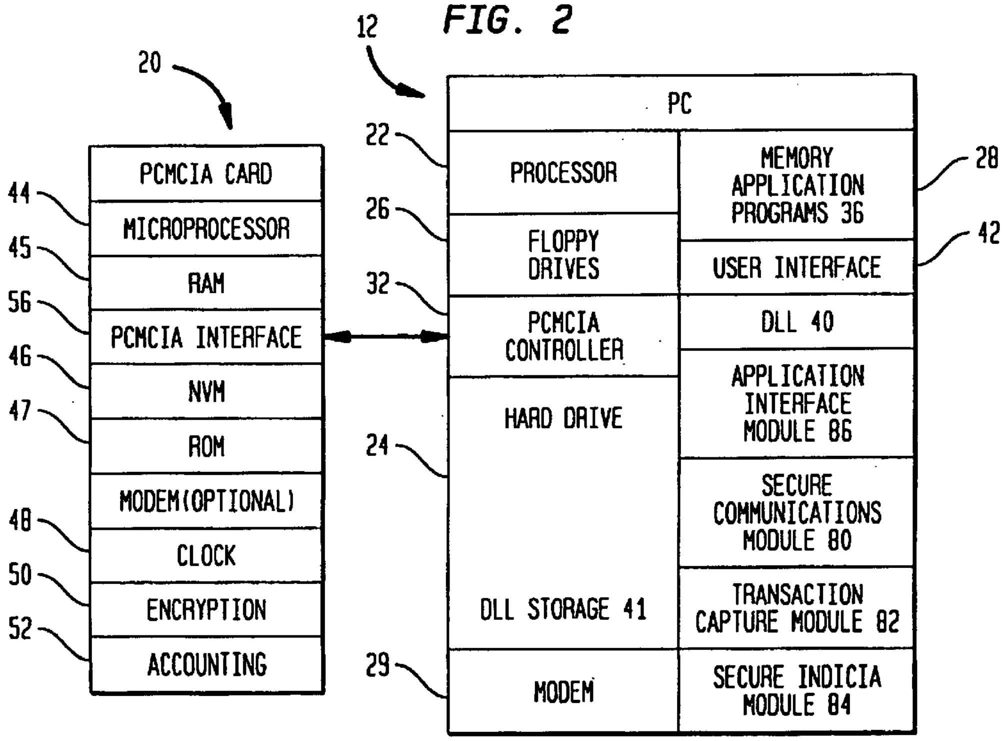
FIG. 2 is a schematic block diagram of the PC-based metering system of FIG. 1 including a removable vault card and a DLL in the PC.
Figure 3:
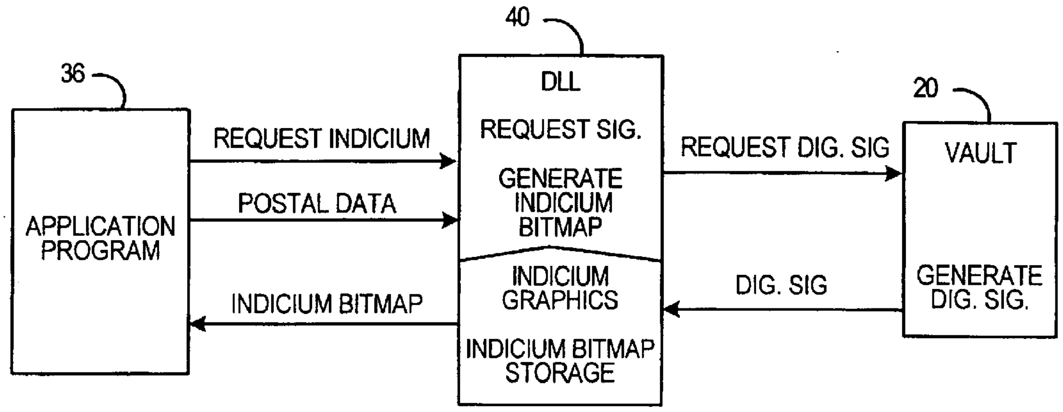
FIG. 3 is a schematic block diagram of the DLL in the PC-based metering system of FIG. 1 including interaction with the vault to issue and store digital signatures.
Figure 4:
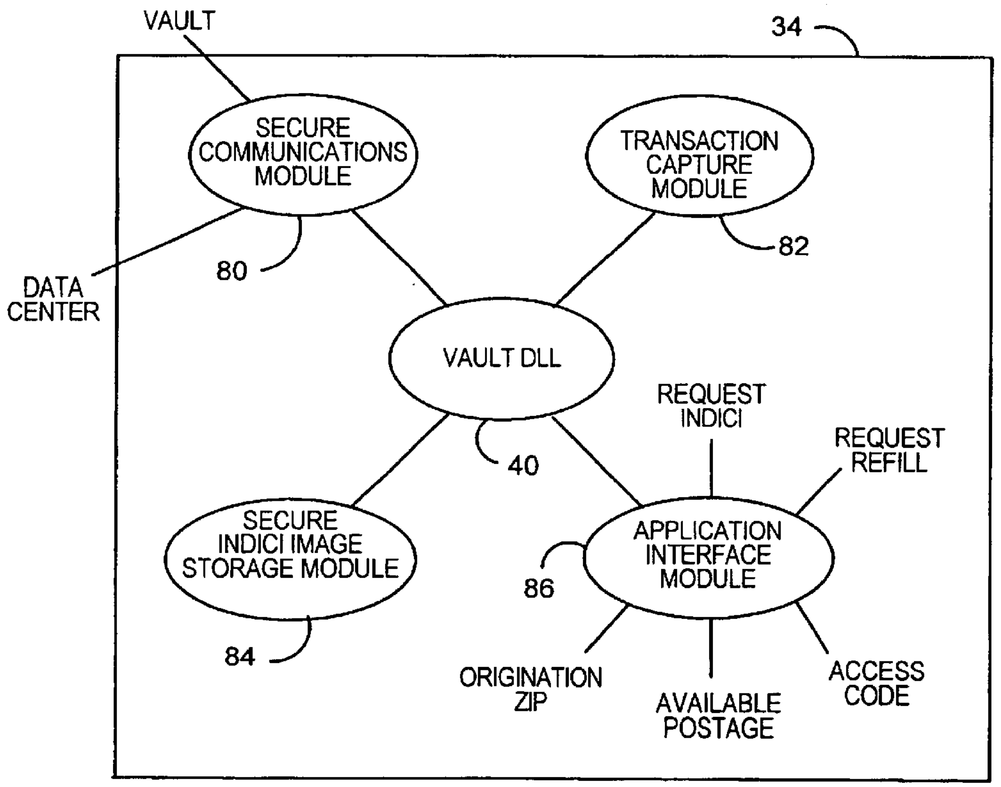
FIG. 4 is a block diagram of the DLL sub-modules in the PC-based metering system of FIG. 1.

The vault 20 is housed in a PCMCIA I/O device or card which is accessed through a PCMCIA controller 32 in PC 12. A PCMCIA card is a credit card size peripheral or adapter that conforms to the standard specification of the Personal Computer Memory Card International Association (optionally, vault 20 may be located in a secure data center and accessed via any suitable communication network). Referring now to FIGS. 2 and 3, the vault 20 includes a microprocessor 44, redundant non-volatile memory (NVM) 46, clock 48, an encryption module 50 and an accounting module 52. The encryption module 50 may implement the NBS Data Encryption Standard (DES) or another suitable encryption scheme. In the preferred embodiment, encryption module 50 is a software module. It will be understood that encryption module 50 could also be a separate device, such as a separate chip connected to microprocessor 44. Accounting module 52 may be EEPROM that incorporates ascending and descending registers as well as postal data, such as origination ZIP Code, vendor identification, data identifying the PC-based postage meter 10, sequential piece count of the postage indicium generated by the PC-based postage meter 10, postage amount, the date of submission to the Postal Service and any other postal related data that is desired. As is known, an ascending register in a metering unit records the amount of postage that has been dispensed, i.e., issued by the vault, in all transactions and the descending register records the value, i.e., amount of postage, remaining in the metering unit, which value decreases as postage is issued.

The hardware design of the vault includes an interface 56 that communicates with the host processor 22 through PCMCIA controller 32. Preferably, for added physical security, the components of vault 20 that perform the encryption and store the encryption keys (microprocessor 44, ROM 47 and NVM 46) are packaged in the same integrated circuit device/chip that is manufactured to be tamper proof. Such packaging ensures that the contents of NVM 46 may be read only by the encryption processor and are not accessible outside of the integrated circuit device. Alternatively, the entire vault 20 could be manufactured to be tamper proof.

The memory of each NVM 46 is organized into sections. Each section contains historical data of previous transactions by vault 20. Examples of the types of transactions include: postage dispensed, postage refills, configuration parameters, reissued postage indicium data, and postal and vendor inspections. The size of each section depends on the number of transactions recorded and the data length of the type of transaction. Each section in turn is divided into transaction records. Within a section, the length of a transaction record is identical. The structure of a transaction record is such that the vault can check the integrity of data.

The functionality of DLL 40 is a key component of PC-base meter 10. DLL 40 includes both executable code and data storage area 41 that is resident in hard drive 24 of PC 12. In a Windows environment, a vast majority of applications programs 36, such as word processing and spreadsheet programs, communicate with one another using one or more dynamic link libraries. PC-base meter 10 encapsulates all the processes involved in metering, and provides an open interface to vault 20 from all Windows-based applications capable of using a dynamic link library. Any application program 36 can communicate with vault microprocessor 44 in vault 20 through DLL 40.

DLL 40 includes the following software sub-modules. Secure communications sub-module 80 controls communications between PC 12 and vault 20. Transaction captures sub-module 82 stores transaction records in PC 12. Secure indicia image creation and storage sub-module 84 generates an indicium bitmap image and stores the image for subsequent printing. Application interface sub-module 86 interfaces with non-metering application programs and issues requests for digital signatures in response to requests for indicium by the non-metering application programs.

Digital Signature Generation Process

In accordance with the present invention, when a request for the dispensing of postage (and therefore a request for authentication information) is received from PC 12, vault 20 calculates and issues authentication information such as a digital signature (or unique serial number or digital token) to PC 12 in response to the request. The issued digital signature is stored as part of a transaction record (together with other indicium data elements described in more detail below) in PC 12 for printing immediately or at a later time. In the preferred embodiment of the present invention, the transaction record is stored in a hidden file in DLL storage area 41 on hard drive 24. Each transaction record is indexed in the hidden file according to, for example, addressee information. It has been discovered that this method of issuing and storing digital signatures provides an additional benefit in that one or more digital signatures can be reissued whenever a misprint of a postage indicium has occurred.

By storing digital signatures as part of transaction records in PC 12 the digital signatures can be accessed at a later time for the generation and printing of postage indicium which is done in PC 12. Furthermore, if a digital signature is lost, i.e., not properly printed on a mailpiece, the digital signature can be reissued from DLL 40 rather than from vault 20. The storage of transaction records in DLL 40 that include vault status at the end of each transaction provides a backup to the vault 20 with regard to accounting information as well as a record of issued digital signatures and associated postage indicium data. The number of transaction records stored on hard drive 24 may be limited to a predetermined number, preferably including all transactions since the last postage refill of vault 20.

The concurrent storage of transaction records in NVM 46 and DLL 40 for all postage metering system 10 transactions permits an effective auditing of the postage metering system 10 to be accomplished. When a customer requests the dispensing of a postage amount in the form of a printed postage indicium, a transaction record of that postage indicium is stored in both NVM 46 and DLL storage 41.

Figure 5:
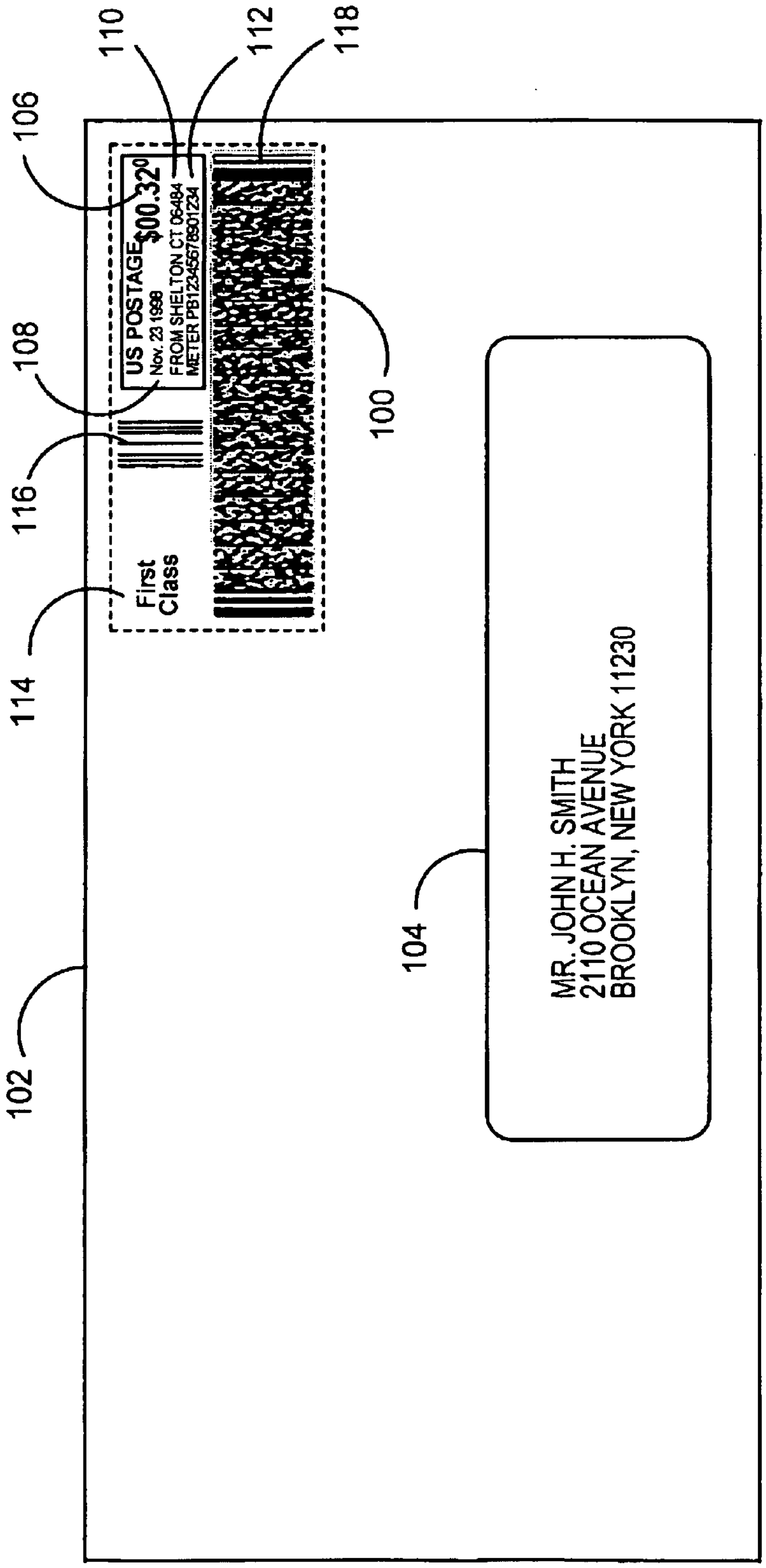
FIG. 5 shows an original postage indicium printed by the PC-based metering system of FIG. 1.

Referring to FIG. 5, a representative original postage indicium 100 printed by the postage metering system 10 is shown on a sealed mailpiece or package 102 containing thereon a recipient address field 104. The original postage indicium 100 contains a postage amount 106, a date 108 that the evidence of postage was affixed to the mailpiece 102, a location that the mailpiece was mailed from 110, a meter identification data set 112, the class of mail 114, a FIM code 116, and a 2D barcode 118.

Referring to FIG. 6, a table 120 shows all of the indicium data elements 122 proposed by the United States Postal Service for inclusion in a postage indicium. The data elements 122 are shown as being in the postage indicium 100 in human readable form, bar code readable form or both forms. The information included in the bar code 118 may include all or only some of the data elements 122 depending upon the security scheme desired. However, whichever data elements 122 are included in the bar code 118 they are digitally signed with the private key of the postage metering system 10 thereby creating the digital signature 123 and cryptographically securing the original postage indicium 100. Upon receipt of the mailpiece 102, the cognizant postal authority can obtain a corresponding public key in order to verify the authenticity of the cryptographically secured information in the postage indicium 100. Table 120 also shows that there is a reserve field 124 that contains no data element and is reserved for future use. It is intended that the reserve field not be part of the digitally signed data elements.

The detailed operation of the postage metering system 10 is more fully described in the aforementioned U.S. patent application Ser. No. 08/575,110. However, such description is not considered necessary for an understanding of the instant invention. At a more basic operational level, when a request to dispense an original postage indicium 100 is made by the customer, the postage metering system 10 verifies the availability of the requested postage amount and performs other internal consistency checks. If all checks are acceptable, a transaction record including all of the indicium data elements 122 set forth in FIG. 6 is created including the digital signature 123 that is generated by the vault 20. The transaction record is stored in NVM 46 and DLL storage 41 and the original postage indicium 100 subsequently printed on the mailpiece 102.

Figure 7:
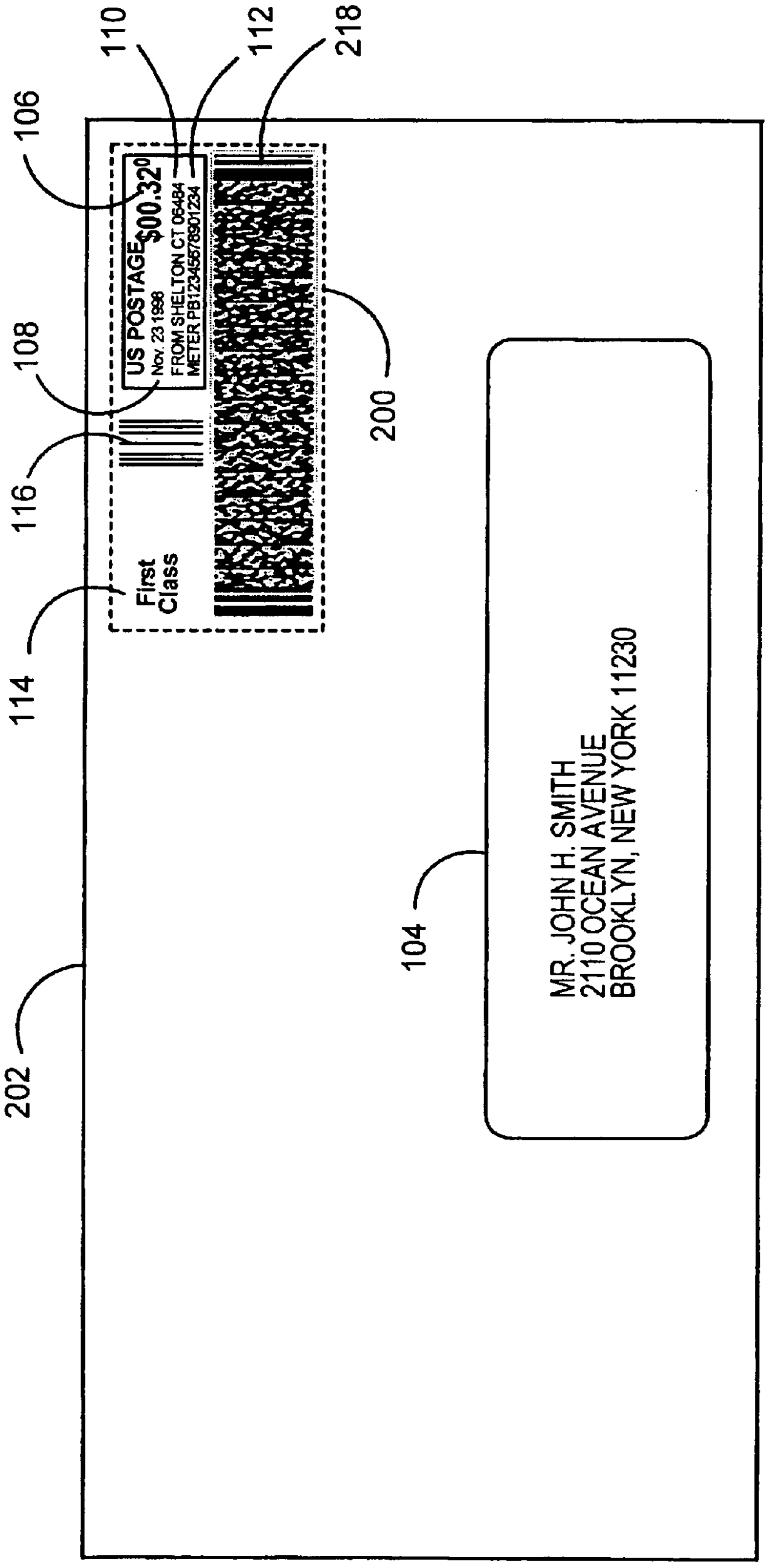
FIG. 7 shows a modified original postage indicium that has been reissued by the PC-based metering system of FIG. 1.
Figure 9:
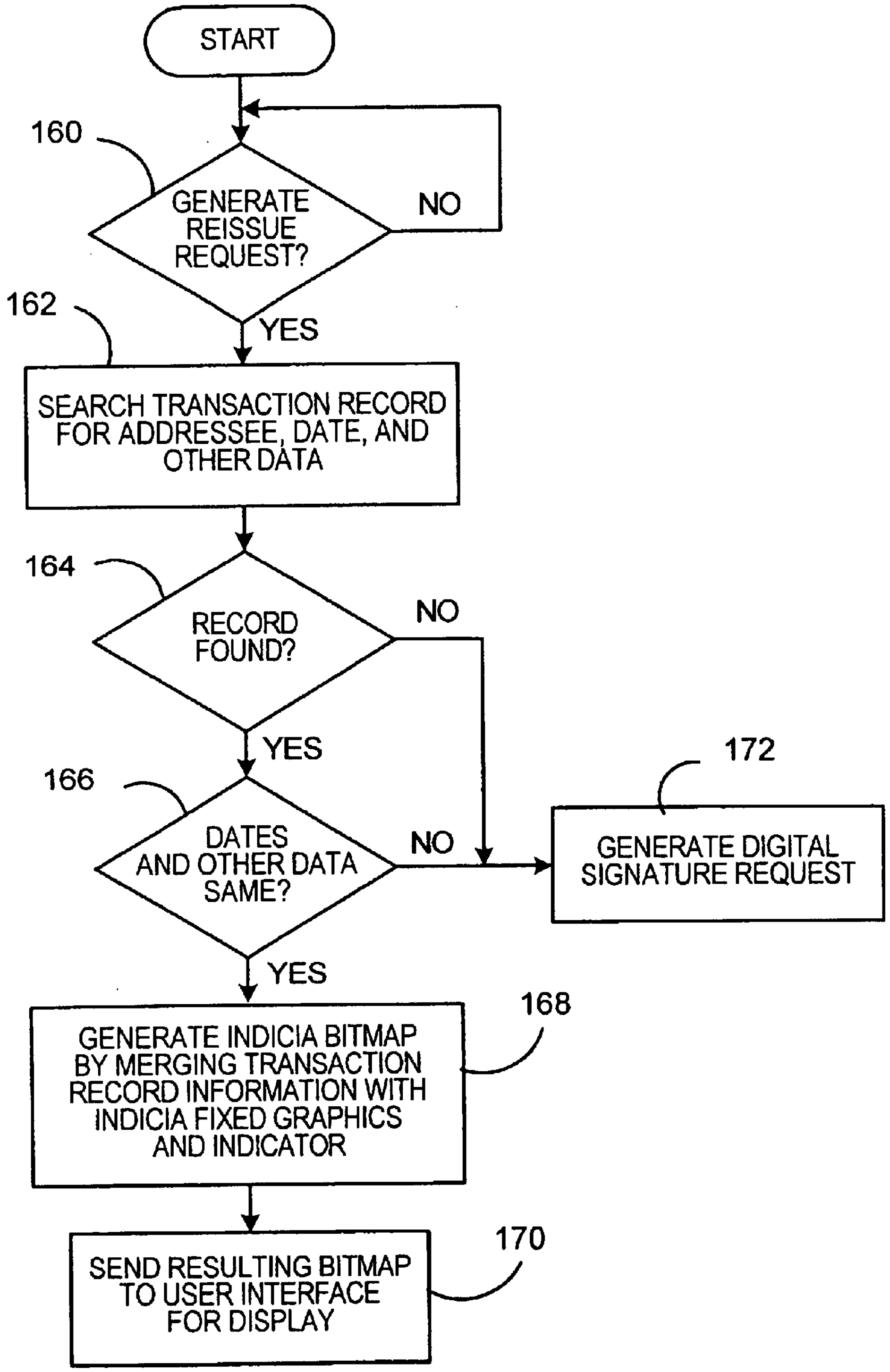
FIG. 9 is a flowchart of the postage indicium reissue process.

Referring now to FIGS. 7–9, the postage indicium reissue process will be described. FIG. 7 shows a mailpiece 202 having a reissued postage indicium 200 (modified original postage indicium) printed thereon. Reissued postage indicium 200 differs from the original postage indicium 100 in that within its bar code 218, in addition to the data elements 122, there is an additional data element that identifies the reissued postage indicium 200 as being reissued from a previously issued original postage indicium 100. That is, FIG. 8 shows a table 220 which identifies all of the data elements 222 that are to be included in the reissued postage indicium 200. As shown in table 220, instead of an empty reserve field 124, a reissued indicium indicator 224 has been included within the data elements 222. The reissued indicium indicator 224 is also included in the bar code 218 but is not part of the digital signature data element 123. Accordingly, the reissued postage indicium 200 is easily identified as not being an original postage indicium 100 when the bar code 218 has been scanned and read. It is further noted that the transaction records that are stored in DLL 41 upon the dispensing of an original postage indicium 100 or a reissued postage indicium 200 respectively include all of the data elements 122 and 222.

Referring specifically to FIG. 9, at step 160 a check is made within PC 12 to determine if a customer has entered a request for the reissue of an original postage indicium 100 due to the occurrence of a misprint. If such a request has been made, a search of the transaction records in DLL file storage 41 for an addressee, date corresponding to the original postage indicium 100 requested for reissue, and any other specified data is conducted. If an original postage indicium transaction record is found, at step 164, for the requested addressee, then a check is made, at step 166, to verify that the requested date and the original postage indicium transaction record date are the same as well as to ensure consistency between the other specified data. If the consistency checks for the dates and the other specified, data are acceptable, at step 168, an indicium bitmap of a reissued postage indicium 200 is generated by the Indicium Image Creation Module 84. The Indicium Image Creation Module 84 combines the data elements 122 of the original postage indicium transaction record found at step 164 with the reissue indicium indicator 224 and all fixed graphics of the reissued postage indicium 200 (such as the term "US POSTAGE") that are also stored in DLL storage 41 to create the bitmap image of modified original postage indicium 200. The generated reissued postage indicium bitmap is sent to the user interface for display at step 170. The customer can view the reissued postage indicium 200 image on the display 14 and indicate that the reissued indicium 200 should be printed by the printer 18 on the mailpiece 202, if acceptable. Since the reissued postage indicium 200 is generated from the original postage indicium transaction record stored in DLL storage 41, no accounting within vault 20 occurs during the printing of the reissued postage indicium 200. Returning to step 164, if no matching original postage indicium transaction record is found for the requested addressee, or if the results of the consistency checks of the dates or other specified data are not acceptable, at step 166, then a request for a new original postage indicium 100 is issued at step 172. It is to be noted that the type of data in the preferred embodiment that is checked to identify the original transaction record is by way of example and not limitation. Only minimal information is needed to identify the record while other data checks can be used to prevent fraud.

Additionally, subsequent to printing of the reissued indicium 200, a reissued indicium transaction record is created and stored in NVM 46 and DLL storage 41. The reissued indicium transaction record differs from the original postage indicium transaction record identified at step 164 because it includes the reissue indicium indicator 224 instead of empty reserve field 123.

Figure 10:
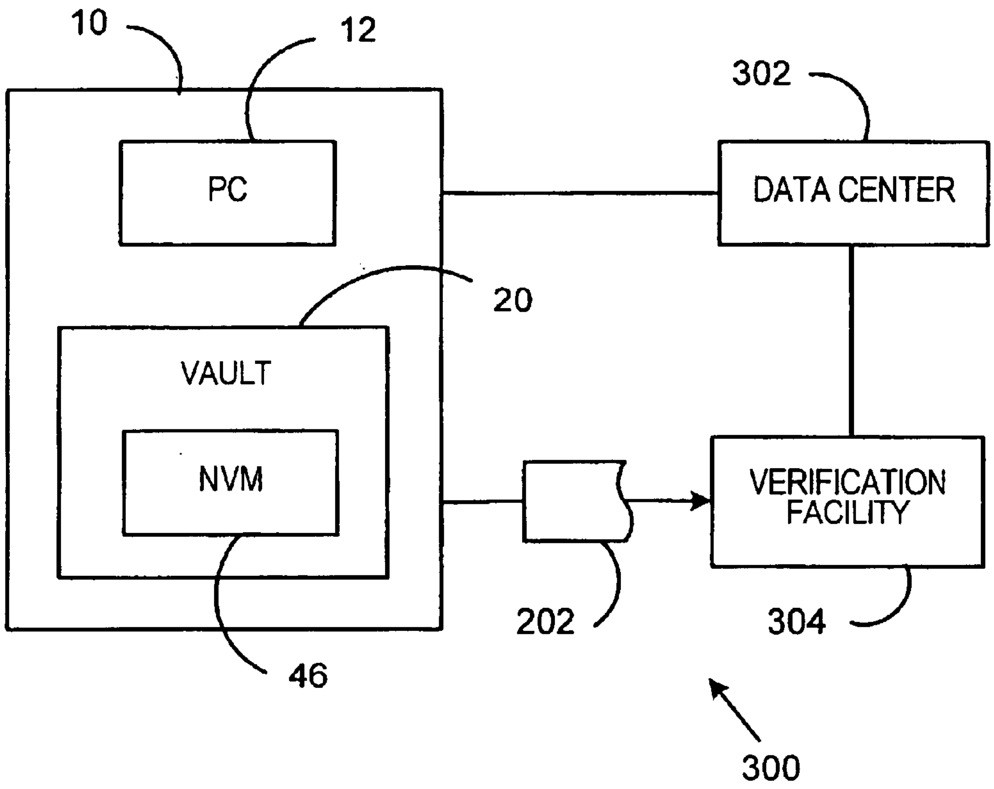
FIG. 10 is a block diagram of a postage indicium data collection and analysis system.

Referring to FIG. 10, a postage indicium data collection and analysis system 300 is shown. The benefits of storing transaction records for the reissued postage indicium 200 is that on a periodic basis all of the transaction records in both the NVM 46 and the PC 12 are uploaded to a postal authority data center 302. The transaction records will include not only the original postage indicium dispensed transaction records and the reissued postage indicium dispensed transaction records but all funds and security related events such as refills and audits. The postal authority can analyze all of the transaction records to determine if any inconsistencies exist that might be an indication of fraudulent activity.

For example, the transaction records can be examined to determine if an unusually high number of reissued postage indicium 200 have been dispensed by a particular postage metering system 10. This would raise the suspicion of fraudulent activity that could be further investigated. Alternatively, the high number of reissued postage indicium 200 might be an indicator of an improperly functioning postage metering system 10 which requires maintenance.

Furthermore, the uploaded transaction files can be used to identify when unusual trends in the dispensing of reissued postage indicium 200 occurs. That is, if the number of reissued postage indicium 200 significantly increases over a given period of time while the actual postage dispensed and accounted for significantly decreases, an investigation into potential fraudulent activity can be initiated.

In addition to the above, since the postage indicium on the mailpiece is scanned at a postal verifying facility 304, additional tools are available for detecting potential fraud. For example, if a reissued postage indicium 200 and its corresponding original indicium are both scanned from separate mailpieces, this is a clear indication of fraud. Moreover, if someone attempted to delete the transaction record of the reissued postage indicium 200 from memory, the reissued postage indicium 200 would still be detected off of the mailpiece at the verifying facility 302. The inconsistency between data scanned from the mailpiece and that of the uploaded transaction records would be an indication of fraudulent activity.

A further improvement that can be implemented to detect the deletion of reissued postage indicium 200 transaction records is to modify the original postage indicium transaction record when a reissued postage indicium 200 is dispensed instead of creating a separate reissued postage indicium transaction record. By modifying the original postage indicium transaction record (i.e. changing reserve field 124 to include the reissued indicium indicator) the deletion of the modified record would easily be detected. That is, if the modified record were deleted, there would be identifiable inconsistencies (gaps) in the ascending register, the descending register, and the total postage loaded into the postage meter 10 based on the analysis of the uploaded transaction records. Accordingly, these inconsistencies would be an indication of a potential fraudulent situation.

A further improvement is to include in the transaction files a reissue index which accounts for the number of times a specific original indicium is reissued. The postage metering system 10 can be programmed to limit the number of times any original postage indicium 100 may be reissued. Accordingly, once the reissue index is at the reissue limit, no further reissues of that original postage indicium may be accomplished. By incorporating the reissue index and a reissue limit, the postage metering system 10 accommodates multiple reprints of reissued postage indicium but only to a limited extent. This provides the customer with some flexibility in the situation where there are legitimate multiple misprints of the original postage indicium and corresponding reissued postage indicium. As a further variation of this concept, a total reissue index can be incorporated in the postage metering system 10 to account for a total number of dispensed reissued postage indicium 200 and to limit the total number of such indicium 200 that can be dispensed, if desired. Furthermore, in another variation the total dollar value associated with all reissued postage indicium 200 can be accounted for within the postage metering system 10. A dollar limit can be incorporated such that when the total dollar value of all reissued postage indicium 200 reaches the dollar limit, no further reissued postage indicium 200 can be dispensed without approval from the postal authority. In all of the above cases where a particular limit is met, the postage metering system 10 is programmed to disable the function of reissuing postage indicium.

Additional advantages and modifications will readily occur to those skilled in the art. Therefore, the invention in its broader aspects is not limited to the specific details and representative devices, shown and described herein. Accordingly, various modifications may be made without departing from the spirit or scope of the general inventive concept as defined by the appended claims. For example, the reissue indicator 224 does not have to be contained in the bar code 218 but could be in human readable form. Additionally, while the cryptographic scheme discussed in the preferred embodiment was a public key infrastructure, the invention is equally applicable to a secret key infrastructure or even a system where indicium are not cryptographically secured. Furthermore, for additional security, any transaction records associated with the reissued indicium (a modified original indicium) can be signed by the vault 20. That is, with reference to FIG. 9, after step 166, the original transaction data elements 122 of the identified transaction record can be sent to the the vault 20. The vault 20 resigns this data together with the reissue indicator 224 (or just signs the data and not the reissue indicator). The resigned data is then sent back to PC 12 for generation of the modified original indicium 200 at step 168. The benefit of this resigning process is that the vault 20 could securely account for all reissues and report them in audit messages to data center 302.

The instant invention is also applicable to any value dispensing device that dispenses evidence of value together with other data similar to the postage indicium (i.e. date, location dispensed, etc.). Moreover, while the instant invention is shown in a PC metering system having a general purpose printer, it can also be incorporated in a conventional closed system postage meter with a dedicated printer or in a virtual metering environment where user vaults reside at a data center remote from the user PC.

What is claimed is:

1. A method of reissuing secured postage indicium comprising the steps of:

dispensing from a postage meter an original postage indicium as evidence of postage dispensed for a requested postage transaction, the original postage indicium including postage information and authentication information;

storing within the postage meter a transaction record for the dispensed original postage indicium, the transaction record including the postage information and the authentication information;

receiving at the postage meter a request to reissue the original postage indicium;

obtaining the postage information and the authentication information from the transaction record;

combining the obtained postage information and the authentication information with an indicator thereby creating a modified original postage indicium;

dispensing the modified original postage indicium from the postage meter so that the indicator is obtainable from the dispensed modified original postage indicium to identify by itself that the dispensed modified original postage indicium is a reissue of the original postage indicium;

including in the postage meter a counter for counting the number of times modified original postage indicium are dispensed from the postage meter;

storing a predetermined reissue limit in the postage meter and disabling the postage meter from dispensing modified original postage indicium when the number of times the modified original postage indicium has been dispensed exceeds the predetermined reissue limit.

2. The method of claim 1, wherein the authentication information dispensed is cryptographically secured.

3. The method of claim 1, further comprising storing within the postage meter a reissued transaction record for the dispensed modified original postage indicium, the reissued transaction record including the postage information, the authentication information, and the indicator.

4. The method of claim 3, further comprising storing a plurality of transaction records and a plurality of reissued transaction records in the postage meter.

5. The method as recited in claim 4, further comprising including in the postage information a date the original postage indicium was dispensed and the amount of postage dispensed via the original postage indicium.

6. The method of claim 5, further comprising evaluating the plurality of transaction records and the plurality of reissued transaction records to determine changes in trends over time with respect to the number of original postage indicium dispensed as compared to the number of modified original postage indicium dispensed.

7. The method of claim 4, further comprising evaluating the plurality of reissued transaction records to determine if the number of dispensed modified original postage indicium is considered as evidence of a potential fraudulent situation.

8. A method of reissuing secured postage indicium comprising the steps of:

dispensing from a postage meter an original postage indicium as evidence of postage dispensed for a requested postage transaction, the original postage indicium including postage information and authentication information;

storing within the postage meter a transaction record for the dispensed original postage indicium, the transaction record including the postage information and the authentication information;

receiving at the postage meter a request to reissue the original postage indicium;

obtaining the postage information and the authentication information from the transaction record;

combining the obtained postage information and the authentication information with an indicator thereby creating a modified original postage indicium;

dispensing the modified original postage indicium from the postage meter so that the indicator is obtainable from the dispensed modified original postage indicium to identify by itself that the dispensed modified original postage indicium is a reissue of the original postage indicium;

storing in the postage meter a total postage value associated with all dispensed modified original postage indicium and disabling the postage meter from dispensing modified original postage indicium if the total postage value exceeds a predetermined total postage value.

9. The method of claim 1, further comprising modifying the transaction record for the dispensed original postage indicium to indicate that it has been reissued as the modified original postage indicium.

10. The method of claim 4, further comprising dispensing the modified original postage indicium by placing a printed version of it on a mailpiece, scanning the mailpiece to obtain the postage information the indicator and the authentication information from the modified original postage indicium on the mailpiece, and comparing the postage information, the indicator, and the authentication information scanned from the mailpiece with the plurality of transaction records and the plurality of reissue transaction records to identify potential fraudulent activity with respect to dispensed modified original postage indicium.

11. A method of reissuing secured indicium comprising the steps of:

dispensing from a value dispensing device an original indicium as evidence of value dispensed for a requested value transaction, the original indicium including value transaction related information and authentication information;

storing within the value dispensing device a transaction record for the dispensed original indicium, the transaction record including the value transaction related information and the authentication information;

receiving at the value dispensing device a request to reissue the original indicium;

obtaining the value transaction related information and the authentication information from the transaction record;

combining the obtained value transaction related information and the authentication information with an indicator thereby creating a modified original indicium;

dispensing the modified original indicium from the value dispensing device so that the indicator is obtainable from the dispensed modified original indicium to identify by itself that the dispensed modified original indicium is a reissue of the original indicium;

including in the value dispensing device a counter for counting the number of times modified original indicium are dispensed from the value dispensing device;

storing a predetermined reissue limit in the value dispensing device and disabling the value dispensing from dispensing modified original indicium when the number of times the modified original indicium has been dispensed exceeds the predetermined reissue limit.

12. The method of claim 11, wherein the authentication information dispensed is cryptographically secured.

13. The method of claim 11, further comprising storing within the value dispensing device a reissued transaction record for the dispensed modified original indicium, the reissued transaction record including the value transaction related information, the authentication information, and the indicator.

14. The method of claim 13, further comprising storing a plurality of transaction records and a plurality of reissued transaction records in the postage meter.

15. The method as recited in claim 14, further comprising including in the value transaction related information a date the original indicium was dispensed and the amount of value dispensed via the original indicium.

16. The method of claim 15, further comprising evaluating the plurality of transaction records and the plurality of reissued transaction records to determine changes in trends over time with respect to the number of original indicium dispensed as compared to the number of modified original indicium dispensed.

17. The method of claim 14, further comprising evaluating the plurality of reissued transaction records to determine if the number of dispensed modified original indicium is considered as evidence of a potential fraudulent situation.

18. A method of reissuing secured indicium comprising the steps of:

dispensing from a value dispensing device an original indicium as evidence of value dispensed for a requested value transaction, the original indicium including value transaction related information and authentication information;

storing within the value dispensing device a transaction record for the dispensed original indicium, the transaction record including the value transaction related information and the authentication information;

receiving at the value dispensing device a request to reissue the original indicium;

obtaining the value transaction related information and the authentication information from the transaction record;

combining the obtained value transaction related information and the authentication information with an indicator thereby creating a modified original indicium;

dispensing the modified original indicium from the value dispensing device so that the indicator is obtainable from the dispensed modified original indicium to identify by itself that the dispensed modified original indicium is a reissue of the original indicium;

storing in the value dispensing device a total value associated with all dispensed modified original indicium and disabling the value dispensing device from dispensing modified original indicium if the total postage value exceeds a predetermined total value.

19. The method of claim 11, further comprising modifying the transaction record for the dispensed original indicium to indicate that it has been reissued as the modified original indicium.

20. The method of claim 14, further comprising dispensing the modified original indicium by placing a printed version of it on a document, scanning the document to obtain the value transaction related information, the indicator and the authentication information from the modified original indicium on the document, and comparing the value transaction related information, the indicator, and the authentication information scanned from the document with the plurality of transaction records and the plurality of reissue transaction records to identify potential fraudulent activity with respect to dispensed modified original indicium.

* * * * *